US006923029B2

(12) United States Patent
Waschgler

(10) Patent No.: US 6,923,029 B2
(45) Date of Patent: Aug. 2, 2005

(54) OPERATING DEVICE

(75) Inventor: Michael Waschgler, Mals (IT)

(73) Assignee: Hoppe AG, St. Martin (IT)

( * ) Notice: Subject to any disclaimer, the term of this patent is extended or adjusted under 35 U.S.C. 154(b) by 0 days.

(21) Appl. No.: 10/411,185

(22) Filed: Apr. 11, 2003

(65) Prior Publication Data

US 2003/0200777 A1 Oct. 30, 2003

(30) Foreign Application Priority Data

Apr. 26, 2002 (DE) .................................... 202 06 732 U

(51) Int. Cl.$^{7}$ ............................................... B60R 25/02

(52) U.S. Cl. .............................. 70/210; 70/89; 70/215; 70/217; 292/336.3

(58) Field of Search ............................ 70/89, 90, 210, 70/215–217; 292/336.3

(56) References Cited

U.S. PATENT DOCUMENTS 4,036,039 A * 7/1977 Nakanishi ...................... 70/90
4,583,775 A * 4/1986 Bisbing ....................... 292/64
5,595,079 A * 1/1997 Myers ......................... 70/233
5,634,357 A * 6/1997 Nutter et al. ................. 70/210
5,634,358 A * 6/1997 Myers ......................... 70/233
5,664,448 A * 9/1997 Swan et al. ................... 70/224
6,029,484 A * 2/2000 Jetton ........................ 70/371
6,178,789 B1 * 1/2001 Finkelstein et al. ........... 70/210
6,354,119 B1 * 3/2002 Molzer ........................ 70/210
6,412,318 B1 * 7/2002 Shen .......................... 70/217
6,502,872 B1 * 1/2003 Molzer .................... 292/336.3
6,546,765 B1 * 4/2003 Linares ....................... 70/210
2003/0000266 A1 * 1/2003 Molzer ........................ 70/210

FOREIGN PATENT DOCUMENTS

DE 29913559.4 8/1999
EP 0260517 3/1988
EP 0386651 9/1990
EP 0460297 12/1991

* cited by examiner

*Primary Examiner*—Suzanne Dino Barrett
(74) *Attorney, Agent, or Firm*—Clark & Brody

(57) ABSTRACT

An operating device for doors, windows, etc. comprises a rosette (20) for holding a rotating handle (10) whose head (12) contains a lock cylinder (18) with an axially displaceable locking bolt (44) that is axially spring-loaded and automatically assumes an engaging position at a defined angle of rotation of the handle (10) by sliding over a stepped locking sleeve (30) of the rosette (20). The lock cylinder (18) has a core (40) with a radial opening (50) in a non-rotating wall (58) for controlled movement of a spindle (48) that radially extends from the locking bolt (44) which engages the locking sleeve in defined angular positions of the handle (10). The opening (50) extends over a peripheral angle of e.g. 180° to 220°, and is a contoured window having a lower flat segment (52), a depression (54) and a steeper segment (flank 56). On top, two straight edge sections (62, 66) run out at a vertical intermediate edge (58) above the depression (54), with lateral edges of the opening (50) forming stops for the spindle (48). If the key S is in the cylinder (18), pivoting the handle (10) from a horizontal position into an upward position (12 o'clock) requires two-hand operation. As the handle (10) is turned down into a transverse position (3 o'clock or 9 o'clock), the locking bolt (44) engages behind a tangential stop (68) under spring load, whether or not the key (S) is in the lock cylinder (18).

15 Claims, 8 Drawing Sheets

Fig. 1a
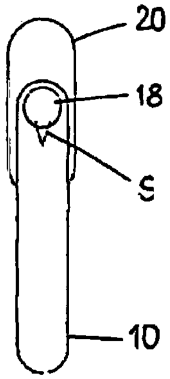
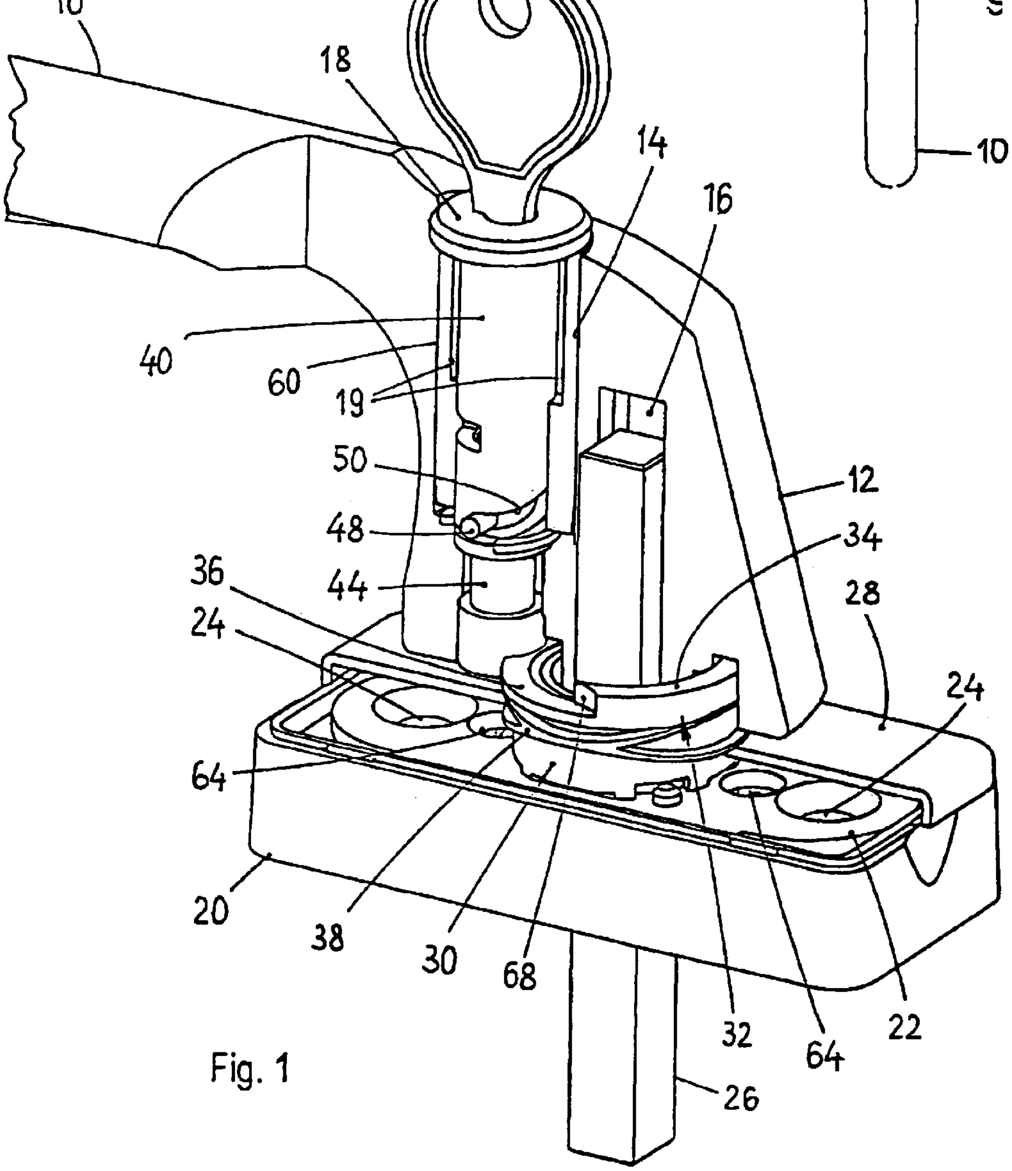
Fig. 1

Fig. 2a
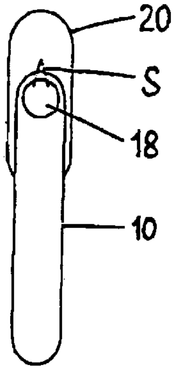
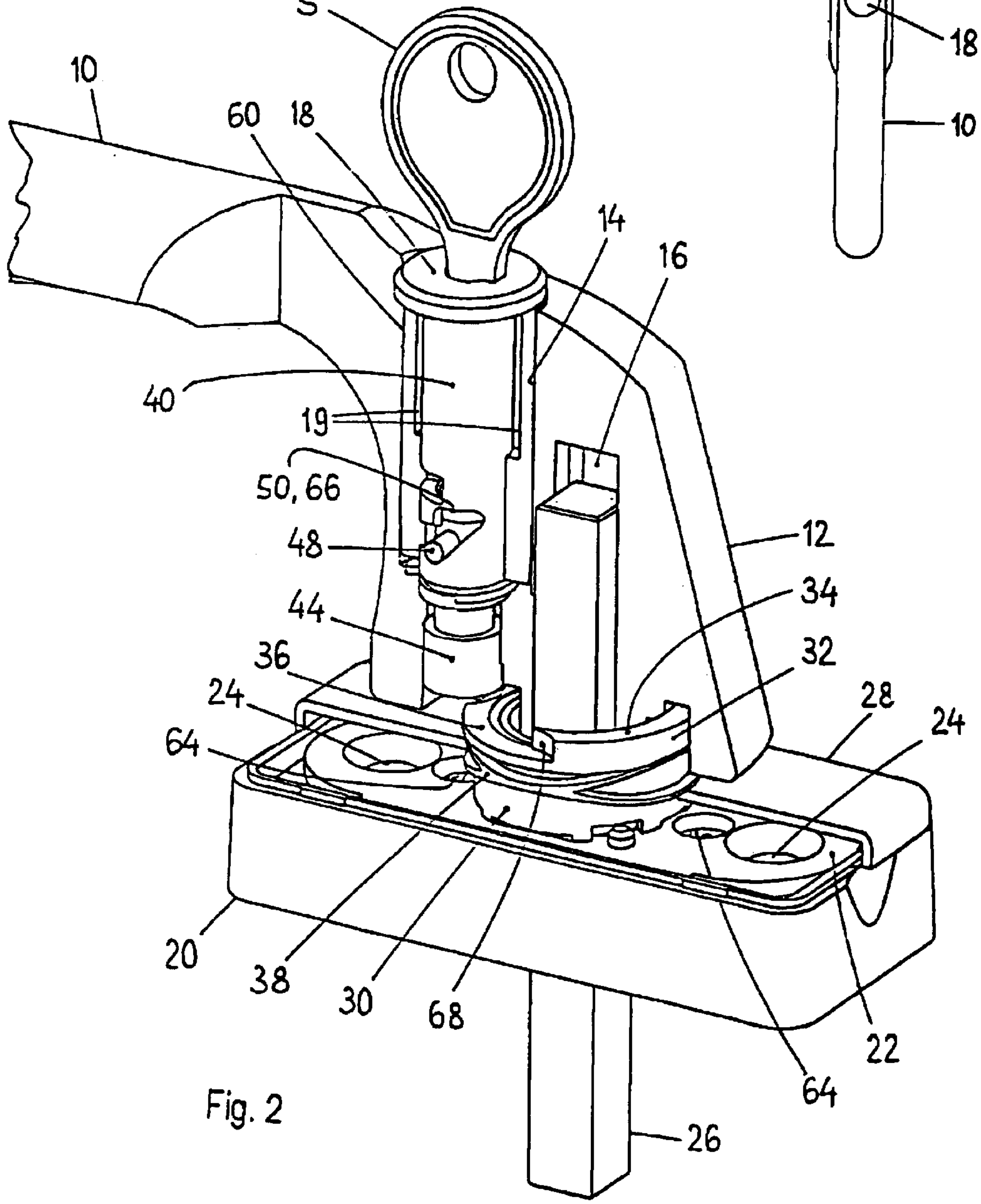
Fig. 2

Fig. 3a
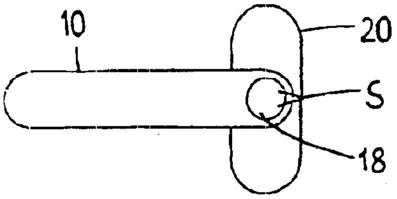
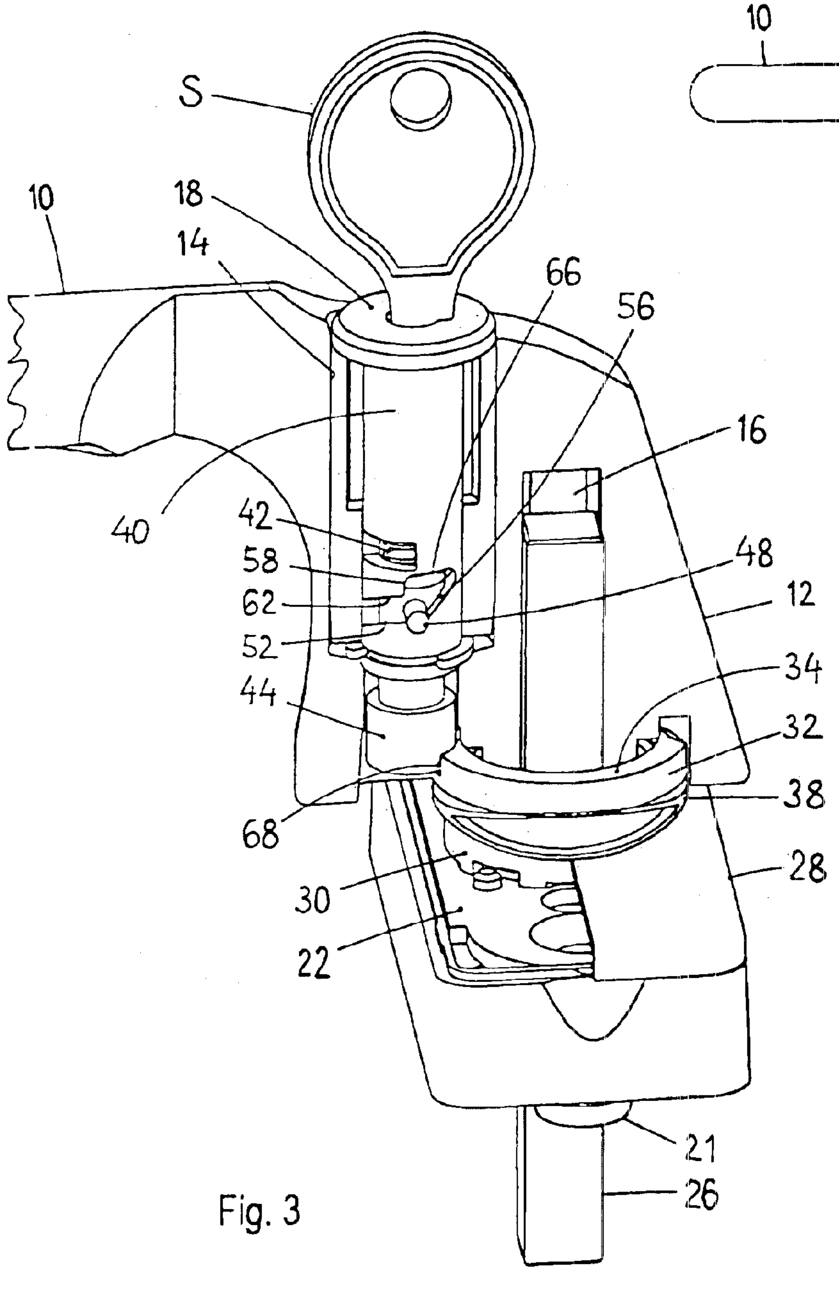
Fig. 3

Fig. 6a
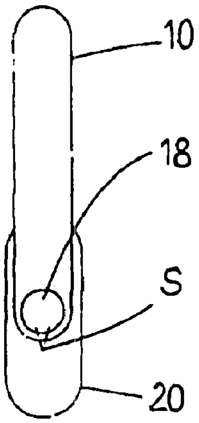
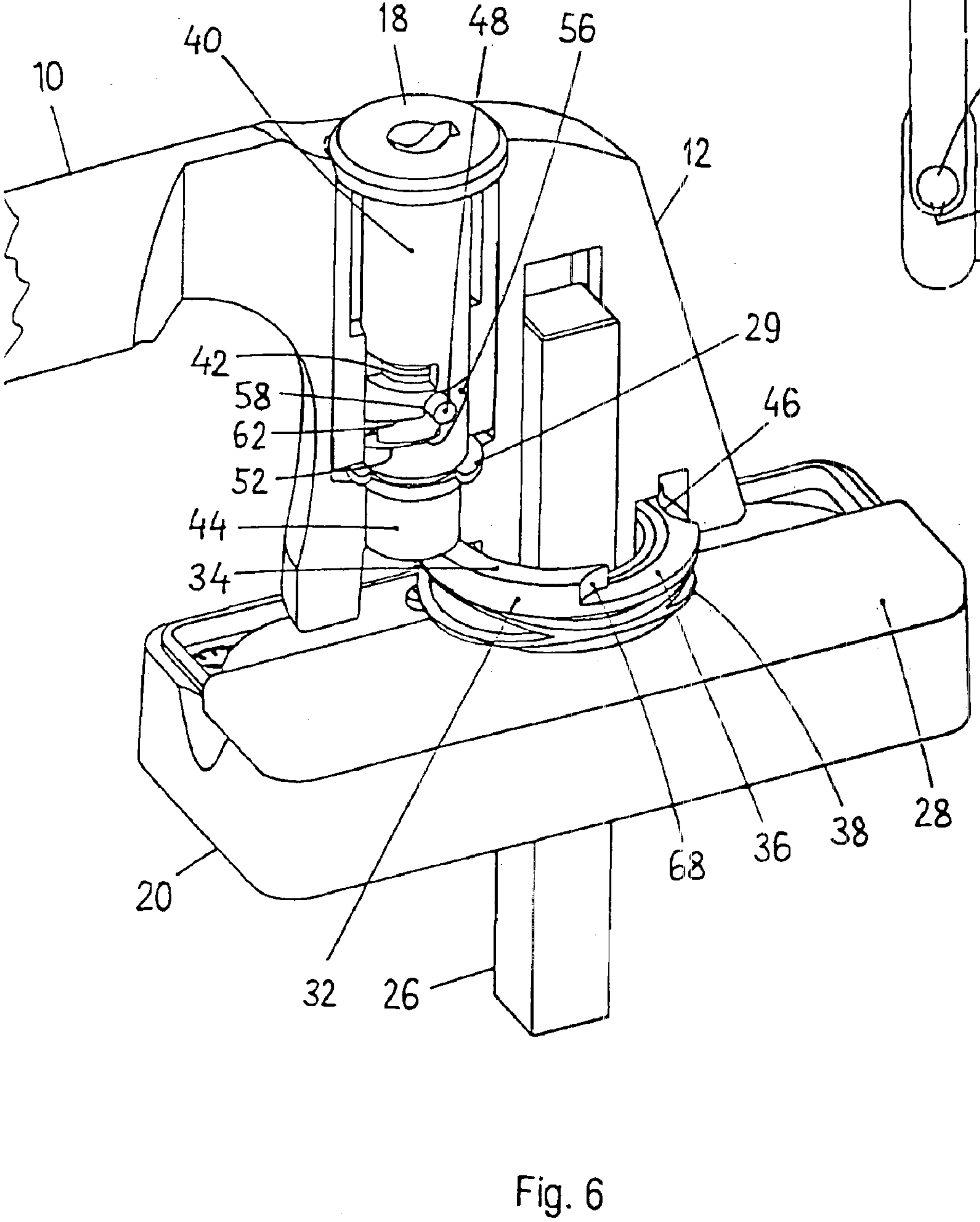
Fig. 6

Fig. 7a
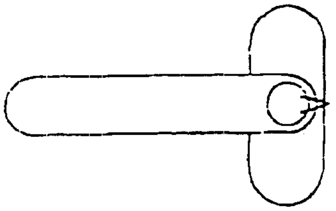
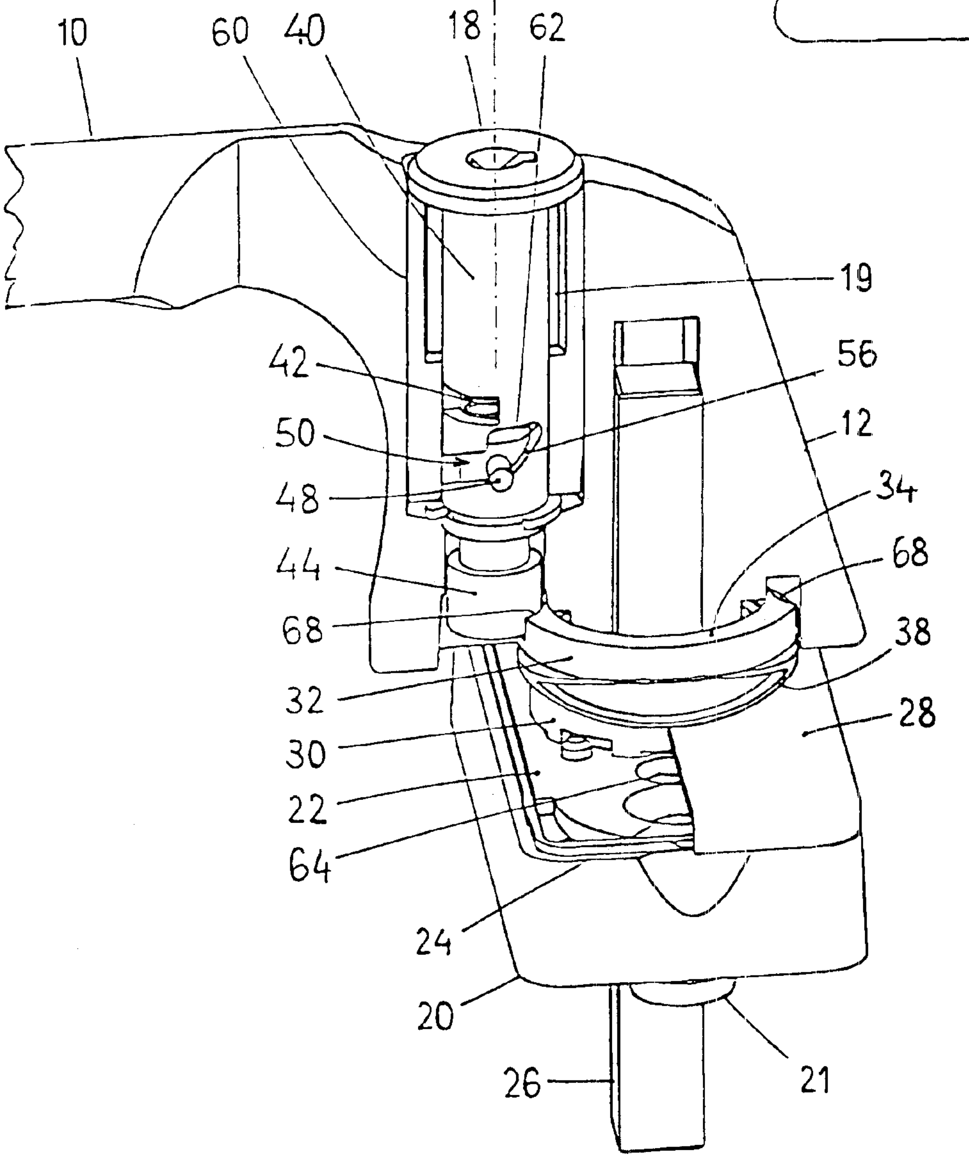
Fig. 7

OPERATING DEVICE

FIELD OF THE INVENTION

The invention relates to an operating device for doors, windows, etc.

For doors, key master systems are common which permit admittance to authorized persons only. Keys of another type than for such key master systems are mostly required for lockable window handles. But for certain applications, handle systems are required which allow it even without special keys to organize the opening and closing of windows or other room closures exclusively by authorized users and which still permit an operation, e.g. for ventilation purposes.

BACKGROUND ART

Devices of various designs have been known for rotary entrainment of an associated means, e.g. a lock follower or a window drive, which entrainment may be suppressed if need be.

For example, DE-U-8 624 544 provides for mounting on a frame, an installation body to which the handle is axially fast connected and which includes engaging means that define preferred or standard angular positions of the handle. EP-B-0 386 651 and EP-B-0 460 297, too, describe each a lockable window handle with a jaw-coupling locking mechanism acting in two steps, whereby the window can be swung open only if the handle has been unlocked. With this arrangement, the window may be tilted even with the handle locked so that the room can always be aired, in fact also by operators who do not have keys.

Some window handles are provided with a push-button unit as an axially movable safety element by means of which, however, even unauthorized persons can bring about or change the closed condition merely through pressing or releasing the push-button. That is undesirable or even inadmissible for certain applications.

DE-U-299 13 559 describes a handle that may optionally be used with or without locking device. It may be equipped—in particular on site—with a cylinder which may be removed at any time, e.g. for replacement by a different locking system. For this purpose, the handle neck has a recess into which a lock cylinder suitable for a key master system may be fitted that acts on an interlocking ring via an adapter designed to be rigidly mounted at the lower end of the cylinder. However, only two final positions of the lock cylinder can be selected.

SUMMARY OF THE INVENTION

It is an important objective of the invention to create, with economic means, an improved operating device for doors, windows, etc. having a lockable handle with a very slim or at least not bulky handle neck and offering various operations for requirements of increased safety. Furthermore, a handle design is aimed at which permits cheap manufacturing and mounting as well as easy reliable manipulation.

For an operating device comprising a rosette for holding a rotating handle whose neck is connected axially fast, e.g. by flanging, to a support inside the rosette, further comprising a lock cylinder located in the handle head and an axially displaceable locking bolt which is adapted to be coupled with a locking member and which engages into said rosette in predefined angular positions of the handle, the invention provides an axially displaceable engaging member that is spring-loaded in an axial direction and is connected with the lock cylinder, which member automatically assumes an engaging position at a defined angle of rotation of the handle. This novel and very effective design ensures quite a number of reliable operating possibilities.

The engaging member is preferably the locking bolt arranged in the lock cylinder; it displaceable in said axial direction under spring load and glides over stepped annular surfaces. This is enhanced if the engaging means is guided in the cylinder by connecting link means. Such a design represents an important improvement over the prior art due to reliable transmission of motion.

In an advantageous embodiment, the cylinder has a non-rotating wall in which a spindle is axially guided that radially extends from the engaging member, preferably in a straight lengthwise groove controlling the stroke of the engaging member.

For a device of the type mentioned above, the invention provides that the lock cylinder has a core provided with a radial opening which guides a spindle radially extending from the engaging member for controlled movement. It is thus possible to define the course of motion in a simple and reliable way, preferably by an arrangement where the opening is a contoured window through which the spindle extends. The shape of said window can be adapted to the requirements of certain applications.

It is advantageous if the opening has at its lower boundary a bent-down contour with a flat segment that continues via a depression to a steeper segment, in particular a steep flank. Thus the extension of stroke is limited in a structurally most simple manner. Moreover, the opening preferably includes at its upper boundary two straight edges axially displaced relative to each other, which sections run mainly in a horizontal direction or transversely to the cylinder axis and which end at a vertical intermediate edge above the depression.

Another feature of the contoured window is that lateral edges of the opening form stops for the spindle, the opening suitably extending over an angle of at least 180°, preferably 220°.

Very important is the feature that if the key has been put into the cylinder, two-hand operation is required, to turn the handle from a horizontal position into a vertical upward position. This arrangement is effective for child security and helps to avoid accidents. A particular design provides that the handle can only be turned upward from a transverse position (3 o'clock or 9 o'clock) while the key is turned against spring load. The locking bolt may be engageable behind a tangential stop under spring load as the handle is turned from its vertical upward position (12 o'clock) into a transverse position (3 o'clock or 9 o'clock), whether or not the key is in the lock cylinder.

BRIEF DESCRIPTION OF THE DRAWINGS

Further features, details and advantages of the invention will be evident from the wording of the claims and from the following description of embodiments by way of the drawings wherein:

FIG. 1 is a partial oblique view of a lockable handle with rosette in an initial position, FIGS. 2 to 7 are partial oblique views each in different operating positions, FIGS. **2*a* to 7*a* show handle positions respective by associated to FIGS. 2 to 7 with key positions indicated

DESCRIPTION OF THE PREFERRED EMBODIMENTS

Figure 4A:
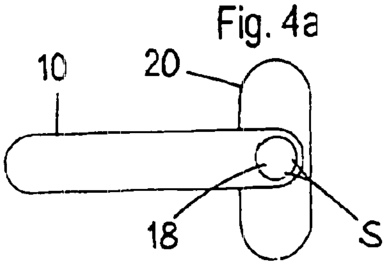

FIG. 1 shows a window handle generally designated by 10, which is axially fast but pivotally mounted in a rosette 20, its handle head 12 being represented partly cut open to permit viewing its interior. The rosette 20 is provided with installation lugs 21 (FIGS. 3, 4, 7) and with a reinforcing plate 22 having screw holes 24. Next to these holes, there are bolt holes 64 on either side. A cover plate 28 which bears with a pressure spring against the bottom of the handle head 12 reaches over the rosette 20 that has a central opening through which—together with a locking element by way of a stepped sleeve 30 fastened in or integral with the rosette 20—a square bar 26 centrally extends which bar engages in a square hole in the handle head 12.

Figures 8A, 8B:
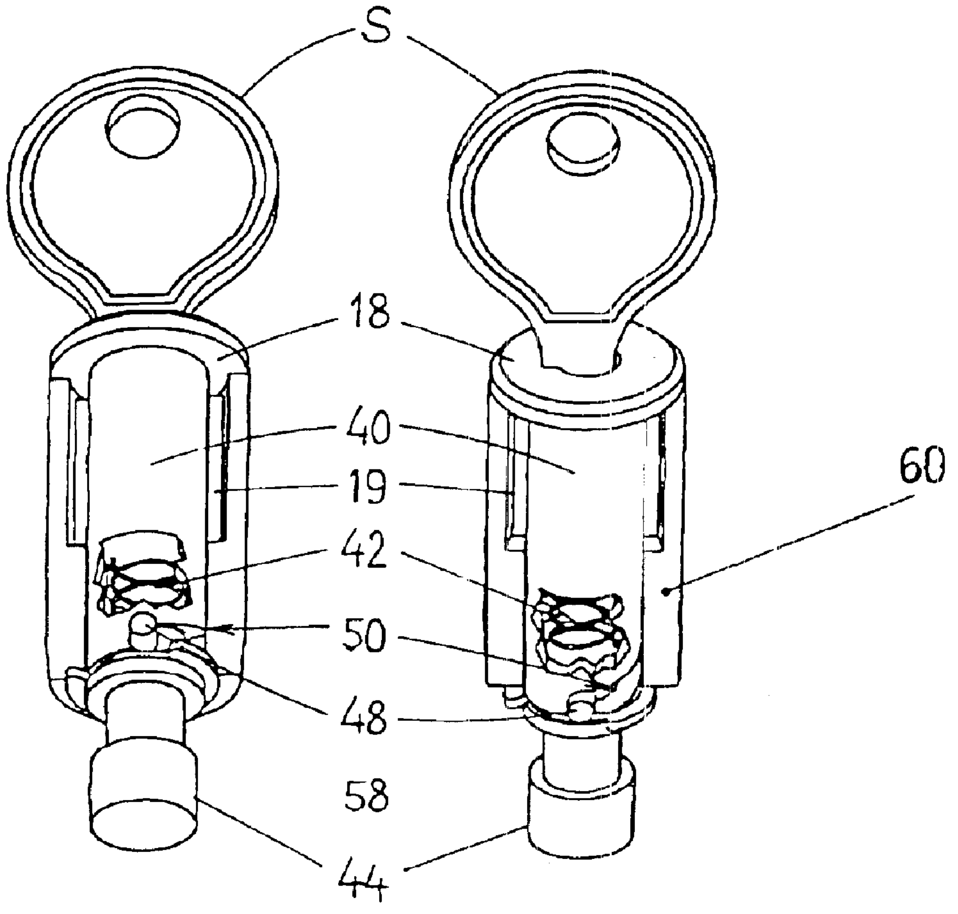
FIGS. 8*a* and 8*b*** are each an oblique bottom view and a top view, respectively, of a lock cylinder partly cut open.

Parallel to the square hole 16 there is an also axially parallel round hole 14 receiving a lock cylinder 18 whose core 40 moves a locking bolt 44 that is permanently loaded by a compression spring 42 in an axial direction, see the detail drawings FIGS. 8*a* and 8*b*. A circlip 29 (FIGS. 4 to 6) secures the lock cylinder 18 against axial tension. Two diametrically opposite lengthwise grooves 19 run in the cylinder wall 60 parallel to the axis A (FIG. 7) and serve for receiving the tumblers (not shown) of the lock cylinder 18 when the key S is to be removed. A spindle 48 which radially extends from the locking bolt 44 guides the latter rotationally fast in a lengthwise groove (not shown) that is located between the grooves 19 in the cylinder wall 60. An annular flange 32 of the locking sleeve 30 has a semicircular collar 34 projecting at the top and—complementing the circle—a lower semi-annular surface 36 that axially recedes from the collar 34, in which surface an axially parallel indentation 46 is provided as a locking element. Said indentation fixes the locking bolt 44 at its circumference to lock and secure the handle 10 against rotation.

Important in the cylinder core 40 is a radial opening 50 whose bottom boundary is formed by a flat and more or less horizontally running spiral portion or segment 52 and an adjacent steeper spiral segment 56. A depression 54 is a bent or curved transition between the segments 52, 56. The flat segment 52 extends preferably over an angle of 180° whereas the steep flank 56 departing from the depression 54 forms an angle of e.g. 40°. At the lateral edges of the opening 50, the segment ends form a stop each for the spindle 48. At the top, straight edges run toward each other from either side of said stop, i.e. a slightly inclined edge 62 and a horizontal edge 66 which are axially displaced relative to each other so that a vertical stepped stop is formed at a vertical intermediate edge 58 above the depression 54.

The function of the operating device is explained below. At first, the window handle 10 is in the initial position of FIG. 1 so that its main part points downward parallel to the lengthwise direction of the rosette 20. The angular position of the key S—see FIG. 1*a*—is defined as the 6 o'clock position, in which the spindle 48 contacts the end of the flat segment 52 (on the left in the illustration) and the locking bolt 44 has entered the indentation 46. The key S can be removed from the locked handle 10. This is a first or basic initial position corresponding to that of any lockable window handle.

In FIG. 2, the window handle 10 also points downward parallel to the lengthwise direction of the rosette 20 but the key S is in the 12 o'clock position according to FIG. 2*a*, i.e. the cylinder 18 has been turned through 180° as against FIG. 1. Owing to this rotation, the spindle 48 has passed over the flat segment 52 and reached the depression 54 whereby the lower end of the locking bolt 44 is slightly above the semicircular surface 36 and thus out of engagement with the indentation 46 (cf. FIGS. 5 and 6). The key S can be removed and the handle 10 can be turned into a transverse position (to the left, to 3 o'clock, FIGS. 3 and 3*a*; or to the right, to 9 o'clock [not shown]) in which the locking bolt 44 contacts either one of two steps or tangential stops 68 at the semcircular collar 34. This is a second operating condition which offers increased safety together with a TBT window drive (tilt before turn mode). For example, everybody, even a child, can without the key S tilt a partly locked window—e.g. for airing—or close it, but cannot open it.

Figure 4:
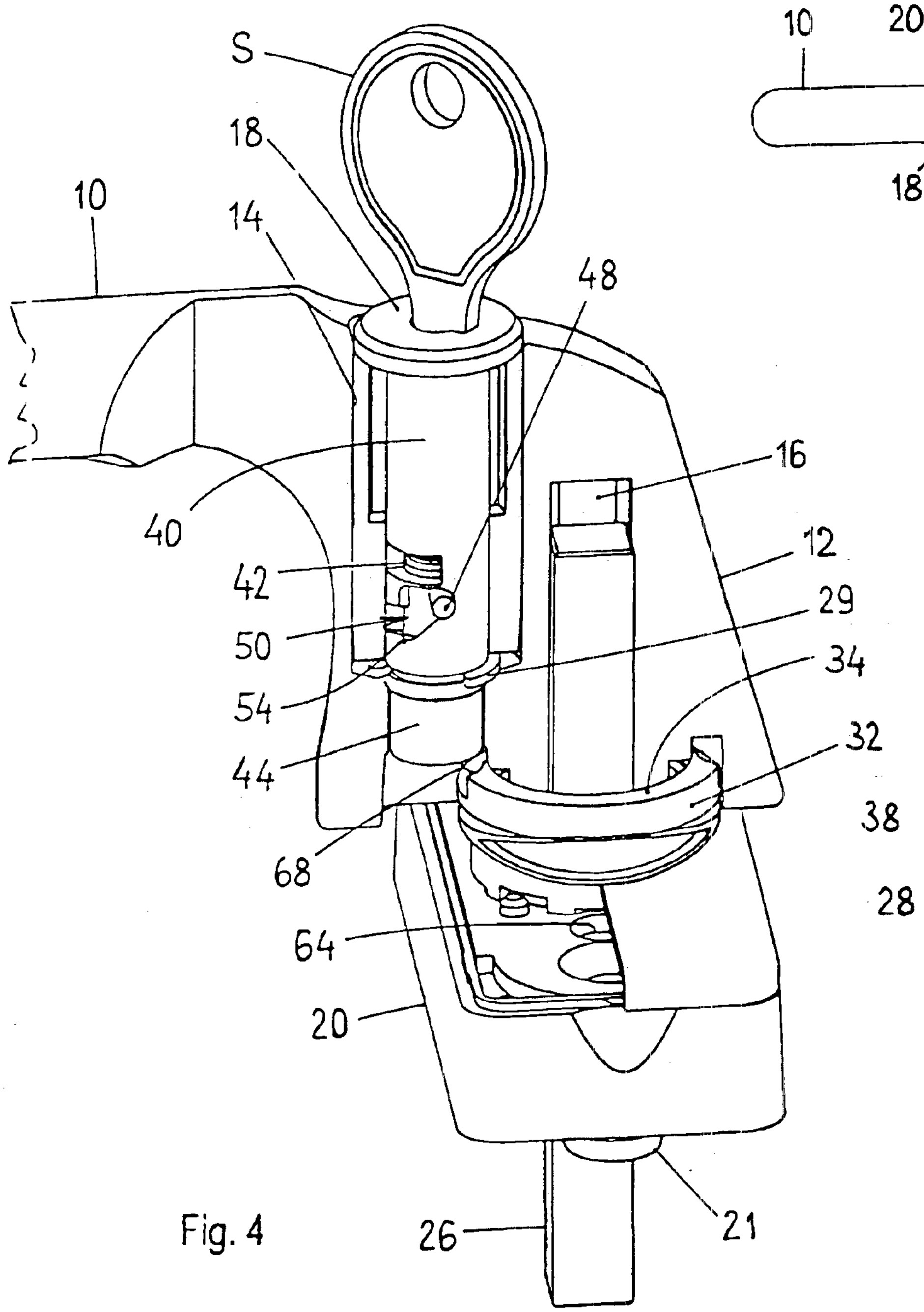
Figure 5A:
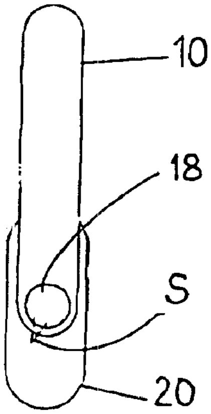
Figure 5:
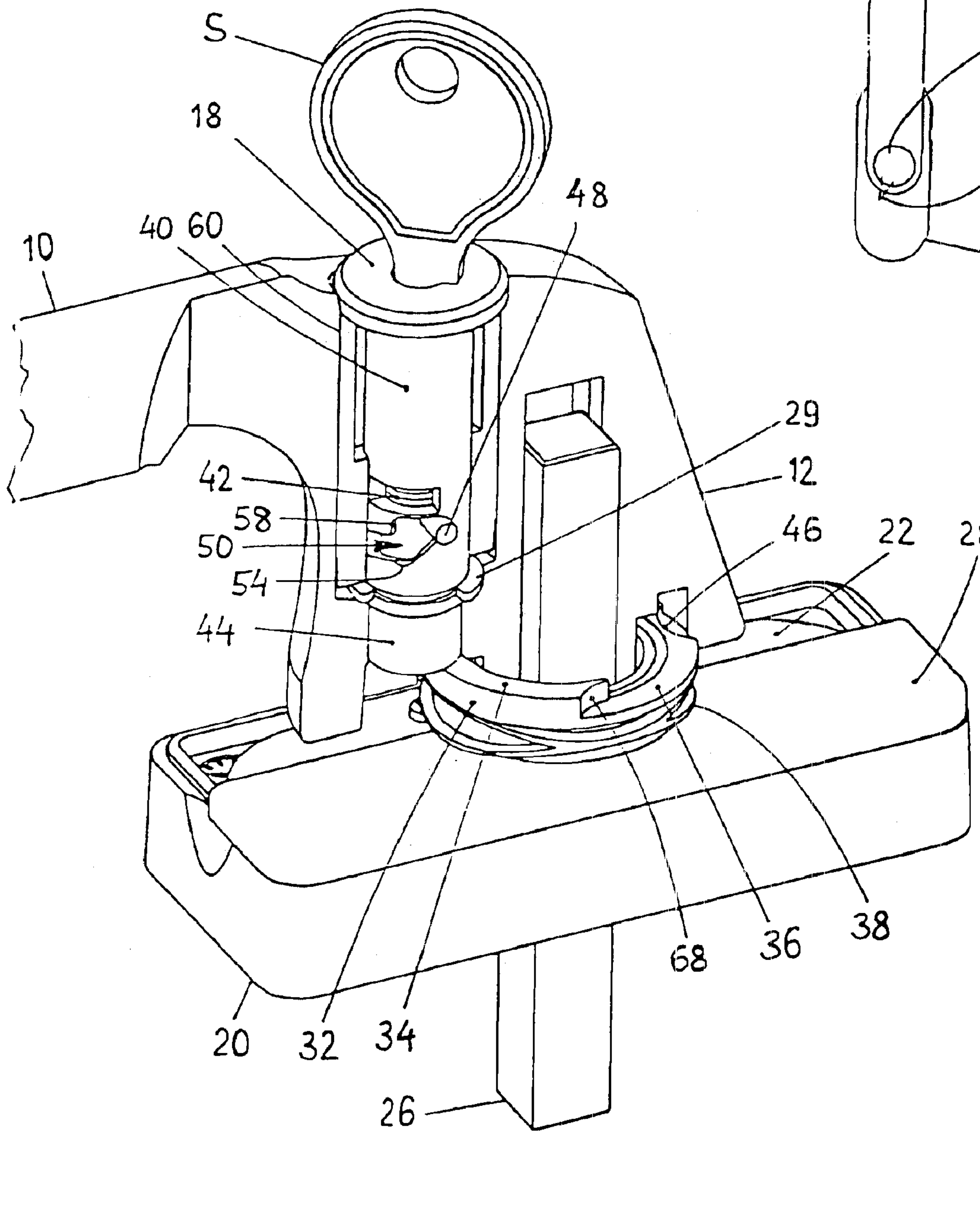

Two-hand operation is necessary in order that the position of FIG. 4 is reached. The cylinder 18 is turned with one hand to the right into the [other] final position (FIG. 4*a*) by means of the key S, the spindle 48 contacting the end of the steep flank or segment 56. As a result, the locking bolt 44 will be maximally withdrawn so that the other hand can bring the window handle 10 into its vertical position (12 o'clock, FIG. 5). The window can be opened in this third condition. Whether or not the key S is in the cylinder, turning of the handle 10 downward into a transverse position will always cause the locking bolt 44 to engage one of the tangential stops 68 because the steepness of the segment 56 excludes automatic locking. This situation still prevails in FIG. 6 where, however the key S has been removed. In order to effect this in the 6 o'clock position of the key S, the lock cylinder 18 had to be turned back before until the spindle 48 reached and tangentially struck the peripheral position of the depression 54 at the intermediate edge 58 while the locking bolt 44 rested spring-loaded on the semicircular collar 34 of the angular flange 32.

As soon as the locking bolt 44 passes over the tangential stop 68 when the handle 10 is turned back, without key, into the position of FIGS. 7 and 7*a*, the spindle 48 will engage in the depression 54 under the load of the compression spring 42. The free end face plane of the locking bolt 44 is then suspended above the semicircular surface 36 of the annular flange 32.

Without in any manner being restricted to the embodiments described above, the invention can be modified in many ways. It exceeds the possibilities of the conventional art which, with only two positions of the lock cylinder, either permitted unrestricted turning of the window handle or its partial turning. The window handle 10 according to the invention may be locked in its initial or basic position, and without key the window will always remain safe because it can be tilted or closed, but cannot be opened. Even if inadvertently the key S has been left in the lock cylinder 18, that will still act as a child safeguard because both hands are necessary to move the handle 10 from a transverse position into the upward vertical position (12 o'clock, FIGS. 5*a* and 6*a*): the handle 10 can be turned upward only if and when one hand turns the key S—which is torsionally spring-loaded onto the steep flank 56—in order that the locking bolt 44 clears the tangential stop 68.

Summarizing, a preferred embodiment of an operating device for doors, windows, etc. comprises a rosette 20 for holding a rotating handle 10 whose head 12 contains a lock cylinder 18 with an axially displaceable locking bolt 44 that is axially spring-loaded and automatically assumes an engaging position at a defined angle of rotation of the handle 10 by sliding over a stepped locking sleeve 30 of the rosette 20. The lock cylinder 18 has a core 40 with a radial opening 50 in a non-rotating wall 58 for controlled movement of a spindle 48 that radially extends from the locking bolt 44 which engages the locking sleeve in defined angular positions of the handle 10. The opening 50 extends over a peripheral angle of e.g. 180° to 220°, and is a contoured window having a lower flat segment 52, a depression 54 and a steeper segment (flank) 56. On top, two straight edge sections 62, 66 run out at a vertical intermediate edge 58 above the depression 54, with lateral edges of the opening 50 forming stops for the spindle 48. If the key S is in the cylinder 18, pivoting the handle 10 from a horizontal position into an upward position (12 o'clock) requires two-hand operation. As the handle 10 is turned down into a transverse position (3 o'clock or 9 o'clock), the locking bolt 44 engages behind a tangential stop 68 under spring load, whether or not the key S is in the lock cylinder 18.

All and any of the features and advantages of the invention, inclusive of design details and of spatial arrangements, as evident from the claims, the specification and the drawings, may be inventionally substantial per se and in most variegated combinations.

Reference List

| | | | |
|---|---|---|---|
| A | axis | S | key |
| 10 | window handle | 38 | compression springs |
| 12 | handle head | 40 | core |
| 14 | round hole | 42 | compression springs |
| 16 | square hole | 44 | engaging member/locking bolt |
| 18 | lock cylinder | 46 | indentation |
| 19 | lengthwise grooves | 48 | spindle |
| 20 | rosette | 50 | (radial) opening |
| 21 | installation lugs | 52 | flat segment/spiral portion |
| 22 | reinforcing plate | 54 | depression |
| 24 | screw holes | 56 | steep segment/flank |
| 26 | square bar | 58 | intermediate edge/step |
| 28 | cover plate | 60 | wall |
| 29 | circlip | 62 | slightly inclined edge |
| 30 | locking element/stepped sleeve | 64 | bolt hole |
| 32 | annular flange | 66 | straight edge |
| 34 | semicircular collar | 68 | tangential stop/step |
| 36 | semi-annular surface | | |

What is claimed is:

1. Operating device for doors, windows, etc. comprising a rosette (20) for holding a rotating handle (10) whose neck is connected axially fast to a support inside the rosette (20), further comprising a lock cylinder (18) located in the handle head (12) and an axially displaceable locking bolt (44) which is adapted to be coupled with a locking member (30) of the rosette (20) and which engages therein in predefined angular positions of the handle (10), the axially displaceable locking bolt (44) being arranged in the lock cylinder (18) and being spring loaded in an axial direction, wherein a free end of the axially displaceable locking bolt (44) is slidable over one or more surfaces of the locking member (30) in a plane perpendicular to the axial direction and the axially displaceable locking bolt (44) automatically assumes an engaging position at a defined angle of rotation of the handle.

2. Device according to claim 1, wherein the locking member (30) is designed as a stepped locking sleeve.

3. Device according to claim 1, wherein the axially displaceable locking bolt (44) is guided in the lock cylinder (18) by a non-rotating wall (58).

4. Device at least according to claim 3, wherein a spindle (48) that radially extends from the axially displaceable locking bolt (44) is axially guided in the non-rotating wall (58).

5. Device according to claim 2, wherein the stepped locking sleeve (30) has first and second steps.

6. Device according to claim 1, wherein the locking member (30) further comprises a first surface, a second surface separated by a pair of vertical stops, the first and second surfaces accommodating sliding of the free end of the axially displaceable locking bolt (44), and an indentation in the second surface for automatic assumption of the axially displaceable locking bolt.

7. Device comprising a rosette (20) for holding a rotating handle (10) whose neck is connected axially fast, e.g. by flanging, to a support inside the rosette (20), further comprising a lock cylinder (18) located in the handle head (12) and an axially displaceable locking bolt (44) which may be coupled with a locking member (30) of the rosette (20) and which engages therein in predefined angular positions of the handle (10), the locking bolt (44) being arranged in the lock cylinder (18) and being spring loaded in an axial direction, wherein the lock cylinder (18) has a core (40) provided with a radial opening (50) which guides a spindle (48) radially extending from the locking bolt (44) for controlled movement.

8. Device according to claim 7, wherein the opening (50) is a contoured window through which the spindle (48) extends.

9. Device according to claim 7, wherein the opening (50) has at its lower boundary a bent-down contour with a flat segment (52) that continues via a depression (54) to a steeper segment (steep flank 56).

10. Device according to claim 9, wherein the opening (50) has at its upper boundary two straight edge sections (62, 66) axially displaced relative to each other, which sections run mainly in a horizontal direction or transversely to the cylinder axis (A) and which end at a vertical intermediate edge (58) above the depression (54).

11. Device according to claim 7, wherein lateral edges of the opening (50) form stops for the spindle (48).

12. Device according to claim 7, wherein the opening (50) extends over an angle of at least 180°, preferably 200°.

13. Operating device for doors, windows, etc. comprising a rosette (20) for holding a rotating handle (10) whose neck is connected axially fast to a support inside the rosette (20), further comprising a lock cylinder (18) located in the handle head (12) and an axially displaceable locking bolt (44) which is adapted to be coupled with a locking member (30) of the rosette (20) and which engages therein in predefined angular positions of the handle (10), the locking bolt (44) being arranged in the lock cylinder (18) and being spring-loaded in an axial direction, wherein if a key S has been put into the locking cylinder (18) pivoting the handle (10) from a horizontal position into a vertical upward position requires a two-hand operation.

14. Device according to claim 13, wherein the handle (10) can be turned upward from a transverse position (3 o'clock or 9 o'clock) only as the key (S) is turned against spring load.

15. Device according to claim 13, wherein, during as the handle (10) is pivoted from the vertical upward position (12 o'clock) into a transverse position (3 o'clock or 9 o'clock) the locking bolt (44) is engageable behind a tangential stop (68) under spring load, whether or not the key (S) is in the lock cylinder (18).

* * * * *